United States Patent Office 3,539,534
Patented Nov. 10, 1970

3,539,534
ARENE-ALDEHYDE RESINS AND METHODS
FOR MAKING THE SAME
Carl R. Manganaro, Penn Hills Township, Allegheny
County, and Elliott V. Nagle, Franklin Township, Westmoreland County, Pa., assignors to United States Steel
Corporation, a corporation of Delaware
No Drawing. Filed Jan. 15, 1968, Ser. No. 697,574
Int. Cl. C08g 7/00
U.S. Cl. 260—67                                7 Claims

ABSTRACT OF THE DISCLOSURE

This invention pertains to improved "formolite" resins resulting from the condensation of an aromatic hydrocarbon and an aldehyde, and particularly to improved thermoplastic naphthalene-formaldehyde resins, and to processes for making the same in a reaction medium containing acetic anhydride.

BACKGROUND OF THE INVENTION

It has long been known that polymers can be prepared from naphthalene and other aromatic hydrocarbons (arenes) by the so-called "formolite" reaction, whereby the arene is condensed with an aldehyde, such as formaldehyde.

The present invention provides improved formolite resins, particularly thermoplastic naphthalene-formaldehyde resins having average molecular weights over about 700 and softening points up to about 180° C. The resins of the invention are soluble in commonly used industrial solvents and find application as molding compositions.

It has been found that such resins can be prepared by copolymerizing an arene, such as naphthalene, and an aldehyde, such as formaldehyde, in the presence of a suitable catalyst, such as sulfuric acid, in a reaction medium comprising acetic anhydride and, optionally, acetic acid.

Naphthalene-formaldehyde resins of the prior art have not come into significant commercial use. Such prior art resins include soluble thermoplastic compositions which, though useful to some extent in special applications such as leather impregnation and the manufacture of pressure-sensitive adhesives, have been of greatly limited usefulness as molding compounds due to their low molecular weights and low softening points.

Such prior art soluble naphthalene-formaldehyde resins are generally prepared by conducting the formolite reaction at elevated temperatures, e.g. about 80–115° C., but at such temperatures the classical formolite reaction does not result in a high degree of polymerization, so that the resulting polymer chains are relatively short, resulting in average molecular weights in the range of about 300–700, and having softening points from about 50 to 150° C. Such low molecular weight polymers are poorly suited to making molded articles because of the instability of such materials to the effects of solvents and temperatures to which such articles are subjected in service. The strengths of articles made from such resins would be very poor.

On the other hand, by use of lower temperatures, e.g. room temperature, naphthalene-formaldehyde polymers have been prepared that apparently have higher molecular weights, but such polymers are insoluble and infusible thermosetting materials, due to excessive branching and cross-linking of polymer chains. Such polymers are largely limited in product application to specialty items such as gelling and thickening agents, and are not useful as molding compositions and the like.

SUMMARY OF THE INVENTION

Accordingly, it is an object of the present invention to provide a new class of formolite resins, especially naphthalene-formaldehyde polymers, that have average molecular weights appreciably higher than 700, preferably over 1000 and up to about 1800, and which are both thermoplastic, having softening points up to 180° C. or more, and soluble in usual aromatic, non-polar commercial solvents.

It is a further object of the invention to provide moldable thermoplastic compositions comprising soluble naphthalene-formaldehyde polymers, and molded articles thereof.

It is another object of the invention to provide new and improved processes for the preparation of soluble, high molecular weight thermoplastic formolite resins, especially naphthalene-formaldehyde resins, comprising condensing the formolite reactants in a reaction medium containing a condensation catalyst and acetic anhydride.

In accordance with the foregoing objects, a preferred embodiment of the inventive process comprises condensing, in a suitable reactor vessel, at a temperature from about 100 to about 115° C., and for about 6 to 8 hours, naphthalene, and formaldehyde (as paraformaldehyde) in amounts of from about 2 to about 3 mols per mol of naphthalene, in the presence of a reaction medium consisting essentially of from about 0.75 to about 1.25 mols each of acetic anhydride and acetic acid per mol of naphthalene, together with a sulfuric acid catalyst in amount of from about 10 to about 15 percent by weight of naphthalene.

DESCRIPTION

Acetic acid has been used heretofore as a constituent in the arene-formaldehyde reaction, as has sulfuric acid. The mechanism of such reactions is not fully understood in the art, but the functions of acetic acid and sulfuric acid are commonly characterized as those of (1) solvent or promoter and (2) condensing agent or catalyst, respectively. Other materials, such as aluminum chloride, ferric chloride, phosphoric acid, zinc chloride, perchloric acid and boron trifluoride have also been used as catalysts in such reactions, and are contemplated for such purpose in the present invention, although sulfuric acid is preferred for reasons of availability, economy and assured reaction performance and product quality.

The principal difference between the process of this invention and prior art processes for preparing arene-formaldehyde polymers lies in the use of acetic anhydride in the polymerization reaction.

The mechanism by means of which acetic anhydride promotes the formation of thermoplastic polymers with higher molecular weights than obtained heretofore is also unknown. It might be considered that the function of this component would be to take up water formed by, and thereby to promote, the poly-condensation reaction expressed in Equation 1.

EQUATION 1

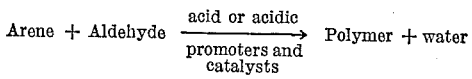

However, no increased molecular weight was obtained when naphthalene and formaldehyde were polymerized in boiling benzene, and the water of condensation continuously removed by azeotropic distillation. Accordingly, although the invention is not to be considered so limited, it is believed to involve a direct participation of acetic anhydride in the polymer formation reactions.

Whatever the mechanism involved, the use of acetic anhydride has been found to lead to the production of new high molecular weight, predominantly linear polymers of greatly enhanced utility as compared to the aforementioned prior art compositions.

Exemplary of the performance of the process of the invention, naphthalene (preferably in molten form in commercial practice) and paraformaldehyde are charged to a reactor kettle. Paraformaldehyde, being low in water content, is preferred over aqueous formaldehyde solutions which would add undesirably large amounts of water to the reaction system, and, being a solid at room temperature, is preferred for ease of handling, as well as speed of reaction, over gaseous formaldehyde, although these other forms may be utilized. Stirring is commenced and a reaction medium solution then added comprising acetic anhydride, acetic acid and sulfuric acid catalyst.

The reaction initially is exothermic, and, in the early stage of the reaction, raises the temperature of the reaction mass by about 10 to 40° C. The magnitude of the initial exotherm is dependent upon the quantities of acetic anhydride, acetic acid and paraformaldehyde used, and is thus believed to result from reaction among these components.

Stirring of the reaction mass is continued and, if necessary, the reaction mass is heated to polymerization temperature, and then maintained at such temperature until the polymer is formed and precipitates from solution. Although the reactants are at least partially soluble in the reaction medium at temperatures as low as about 40° C., complete solution of reactants is not achieved below about 80° C. and the time to complete the polymerization is consequently uneconomically extended at the lower temperature. Moveover, it is desirable to avoid the lower temperatures at which formolite reactions are known to produce insoluble polymers. The reaction is carried out at essentially atmospheric pressure, and the upper temperature limit is determined by the boiling point of the most highly volatile reactant. Therefore, the temperature is maintained in a range of from about 80° C. (the approximate melting point of naphthalene) to about 150° C., and preferably from about 100 to 115° C.

The time for completion of polymerization is dependent upon other process variables, such as concentration of reactants, temperature, etc., but is determinable when the polymer precipitates from the reaction solution. Polymer precipitation has been observed to occur after from 1 to 12 hours, but if the preferred process conditions are employed, polymerization is generally complete within about 7 hours.

A number of experimental example processes, together with products produced thereby, are set forth in the following Table 1.

can be seen from the Table 1 product property data for Example A, the polymer so obtained had an average molecular weight of only 430, and softened in the 80 to 90° C. temperature range.

Examples B–D of Table 1 comprise processes wherein only acetic anhydride and acid catalyst were used in the reaction medium, acetic acid having been omitted entirely. As may be seen from this data, acetic anhydride alone may be employed, but the resultant polymers are not of desirable highest molecular weight, especially when low ratios of formaldehyde to naphthalene are used, as exemplified by Examples B, wherein a 1:1 mol ratio of formaldehyde to naphthalene was productive of a polymer of only 496 average molecular weight. On the other hand, polymer molecular weight can be increased by raising the formaldehyde/naphthalene ratio, e.g. Example C, wherein such reactant ratio of 2.7:1 resulted in a polymer of 968 average molecular weight.

As further shown by Example D, increase of the formaldehyde/naphthalene ratio to 3.5:1 further increased polymer average molecular weight to the range of 1300–1600, but the polymer was not completely soluble in benzene and similar solvents. Inasmuch as utility of the products of the invention depends in large measure upon their thermoplasticity and solubility in commercially useful solvents, infusible, insoluble or partly insoluble resins are not contemplated by the invention, which is directed to resins which are soluble in such solvents as benzene and toluene and other aromatic non-polar solvents, pyridine, and mixtures of pyridine with benzene or toluene.

Accordingly, in order to obtain high molecular weight, soluble polymer, the mol ratio of formaldehyde to naphthalene is limited to about 3.5 on the high side, and formaldehyde is preferably used in minimum amount of about 2.5, optimally about 2.7, mols per mol of naphthalene when acetic anhydride alone is used as a reaction promoter, in an amount from about 0.5 to 2 mols, preferably at least about 1 mol per mol of naphthalene.

Although acetic acid is an optional ingredient in the reaction medium, the presence of at least a small amount of that compound is preferred. Thus, Examples E–M are illustrative of processes wherein both acetic anhydride and acetic acid are included in the reaction medium.

As can be seen from the Table 1 data, the conjoint utilization of acetic anhydride and acetic acid, even when the latter is present in relatively small amounts, as about 0.5 or 0.6 mol per mol of naphthalene, and even when the formaldehyde to naphthalene ratio is relatively low, as about 1:1, is productive of polymers having average

TABLE 1.—POLYMERS BASED ON THE POLYMERIZATION OF NAPHTHALENE AND FORMALDEHYDE

| | Materials used with naphthalene (moles/mole naphthalene)[1] | | | Reactions conditions | | | Product polymer | | | | | |
|---|---|---|---|---|---|---|---|---|---|---|---|---|
| | | | | Temperature,° C. | | | | | Average molecular weight | Elemental analysis, wt. percent | | |
| Ex. | Formaldehyde(para) | Acetic acid | Acetic anhydride | Initial | Polymerization | Time, hrs. | Yield, percent[2] | Softening melting range,° C. | | Carbon | Hydrogen | Oxygen[3] |
| A | 1 | 0.6 | | | 80–113 | 2½ | 79.0 | 80–90 | 430 | 88.6 | 6.1 | 5.3 |
| B | 1 | | 1.3 | 45 | 147 | 12 | 59.8 | 93–108 | 496 | 83.7 | 6.1 | 10.2 |
| C | 2.7 | | 1.0 | 63 | 112 | 6½ | 65.8 | 140–160 | 968 | 91.2 | 6.0 | 2.8 |
| D | 3.5 | | 1.0 | 65 | 108 | 5¾ | 74.0 | 145–185 | (4) | 85.0 | 6.0 | 9.0 |
| | | | | | | | | | (Polymer not completely soluble) | | | |
| E | 1 | 0.6 | 1.0 | 46 | 135 | 1 | 85.6 | 137–147 | 884 | 93.5 | 6.2 | 0.3 |
| F | 1.2 | 3.0 | 1.2 | 52 | 116 | 5¾ | 70.8 | 125–133 | 733 | 93.6 | 6.1 | 0.3 |
| G | 2.4 | 3.0 | 1.2 | 40 | 113 | 5¾ | 71.8 | 140–158 | 1008 | 90.2 | 6.0 | 3.8 |
| H | 2 | 0.6 | 1.0 | 46 | 113 | 4¼ | 78.4 | 152–180 | 1216 | 90.2 | 6.1 | 3.7 |
| I | 2.7 | 1.0 | 1.0 | 40 | 108 | 7 | 72.9 | 145–178 | 1848 | 88.4 | 6.0 | 5.6 |
| J | 3.5 | 1.0 | 1.0 | 56 | 86 | 5½ | 74.2 | 140–163 | Non | 75.9 | 6.2 | 17.9 |
| | | | | | | | | | (Determinable-insoluble) | | | |
| K | 2.7 | 2.0 | 1.0 | 45 | 105 | 6 | 70.0 | 130–160 | 1304 | 89.6 | 6.0 | 4.4 |
| L | 2.7 | 2.0 | 2.0 | 55 | 117 | 6 | 68.7 | 160–180 | 1205 | 91.8 | 6.1 | 2.1 |
| M | 2.7 | 1.4 | 1.0 | 46 | 110 | 7 | 70.0 | 145–183 | 1404 | 90.8 | 6.1 | 3.1 |

[1] Sulfuric acid (95–97% $H_2SO_4$) in the amount of 10 weight percent of the naphthalene was also used.
[2] Based on the weight of naphthalene plus formaldehyde charged.
[3] By difference.
[4] Approximately 1,300 to 1,600.

Example A of Table 1, wherein naphthalene was condensed with paraformaldehyde (1 mol per mol of naphthalene), in the presence of acetic acid (0.6 mol per mol of naphthalene) and using sulfuric acid catalyst, is representative of prior art reactions for the preparation of naphthalene-formaldehyde based formolite polymers. As molecular weights and softening points far above those of the prior art thermoplastic, soluble resins.

Thus, Example E of Table 1 is similar to the typical prior art reaction of Example A (0.6 mol acetic acid per mol of naphthalene), except for the addition of acetic anhydride (1 mol/mol naphthalene), and the use of a higher polymerization temperature and shorter reaction time. It is seen that the Example E process, of only 1 hour's length, gave an 85.6% yield of a polymer having an average molecular weight of 884 and a softening temperature of 137–147° C., in contrast to the Example A process, which, after 2⅓ hours, gave a 79% yield of a polymer having an average molecular weight of only 430 and a softening point range of only 80–90° C.

As in the acetic acid-free system, the processes of Examples E–M also indicate the trend of increasing polymer molecular weight with increase in mol ratio of formaldehyde to napthalene. For example, the process of Example H, with a formaldehyde/naphthalene ratio of 2:1, in contrast to Example E where this ratio was 1:1, was productive of an increase of average molecular weight to 1216 from the 884 value of Example E.

Higher molecular weights, e.g. up to about 1800–1900, are seen to be obtainable with further increase in formaldehyde/naphthalene ratio, up to about 3.5 at which point, as shown by Example J, and as also found in the case of the acetic anhydride system, insoluble, cross-linked resins are obtained.

Therefore, when the mixed acetic anhydride-acetic acid reaction medium is used, formaldehyde is also limited on the high side to about 3.5, preferably about 2.7 to 3, mols per mol of naphthalene. However, as little as about 1 mol of formaldehyde per mol of naphtalene can be used in this mixed promoter system. Lower amounts of formaldehyde are productive of lower than desired polymer molecular weights.

As also shown in Table 1, Examples E–M, acetic acid may be used in amounts up to about 3 mols per mol of naphthalene, in conjunction with acetic anhydride in amounts up to about 2 mols per mol of naphthalene. As shown in Table 1, systems wherein acetic anhydride is present in amount of about 1 mol per mol of naphthalene, are productive of high molecular weight linear resins, and about this amount of acetic anhydride is preferred in conjunction with acetic acid, although as little as about 0.5 mol per mol of naphthalene may be used and still be productive of enhanced molecular weight products.

Substantially larger amounts of total solvent than those indicated above are contraindicated by a tendency toward production of lower molecular weight polymers in the more dilute solutions, as shown by a comparison of Examples I and K, wherein increase in acetic acid from 1 to 2 mols per mol of naphthalene resulted in a decrease in average molecular weight from 1848 to 1304.

An optimum reaction system, productive of soluble, thermoplastic naphthalene-formaldehyde polymers having highest molecular weights and softening temperatures, comprises about 2.5 to 3, preferably about 2.7 mols of formaldehyde, and about 0.75 to 1.25, preferably about 1.0, mols each of acetic anhydride and acetic acid, per mol of naphthalene, as illustrated by Example I of Table 1.

The formolite resins produced by the processes of Table 1 are further characterized by the elemental analyses of carbon, hydrogen and oxygen, as shown in the last three columns of that table.

Although the foregoing specific examples are directed to naphthalene-formaldehyde polymers, which products are of primary interest and commercial application, other resins producible by the formolite reaction, and using substituted naphthalenes or other aromatic hydrocarbons and/or other aldehydes, may also be produced in accordance with the principles of the invention.

It is also to be understood that the new and improved polymers produced by the inventive process may be modified, for particular purposes, for example, by admixture with filler materials, plasticizers, lubricants, coloring agents, stabilizers, and the like.

The modified or unmodified polymers of the invention are readily adaptable to the manufacture of a multitude of product forms, as molded shapes, sheets, foamed articles, etc., by a variety of means, as by casting, extrusion, blowing and the like, as well as to the production of liquid solution products for adhesives, protective coatings and other purposes.

It is to be understood that the use of the term "formaldehyde" in the appended claims is intended to include compositions consisting of a number of formaldehyde units, such as paraformaldehyde.

We claim:

1. A process for the production of moldable thermoplastic resins of improved thermal stability, comprising providing a reactant mixture comprising a solute naphthalene reactant and a solute formaldehyde reactant in amount of about 1 to 3.5 mols per mol of naphthalene reactant, condensing said reactants in the presence of a reaction mixture solvent selected from the group consisting of acetic anyhdride and mixtures thereof with acetic acid, providing at least about 2.5 mols of formaldehyde reactant per mol of naphthalene reactant when acetic acid is excluded from the condensation reaction, and continuing the reaction to form a polymeric resin insoluble in the reaction medium and having a heat-softening point over 120° C. and an average molecular weight greater than 700.

2. A process in accordance with claim 1, wherein an initial reaction mixture is provided containing, in mols per mol of naphthalene, about 0.5 to 2 mols of acetic anhydride, and up to 3 mols of acetic acid.

3. A process in accordance with claim 2, wherein acetic acid is provided in an amount of at least about 0.5 mol per mol of naphthalene.

4. A process in accordance with claim 3, wherein the condensation catalyst is sulfuric acid.

5. A process in accordance with claim 4, wherein the sulfuric acid comprises from about 10 to about 15 weight percent of naphthalene reactant.

6. A process in accordance with claim 5, wherein the reactants are provided, in respective amounts of each per mol of naphthalene, of about: formaldehyde 2:1 to 3:1; acetic anhydride 0.75:1 to 1.25:1; and acetic acid 0.75:1 to 1.25:1.

7. A benzene-soluble, predominantly linear thermoplastic naphthalene-formaldehyde polymer made in accordance with the process of claim 6 and having an average molecular weight over about 1000 and a softening temperature in the range of about 130 to 180° C.

References Cited

UNITED STATES PATENTS 2,302,403 11/1942 Tetley.
3,208,974 9/1965 Roberts.

OTHER REFERENCES

Fulton et al., Industrial & Engineering Chemistry, vol. 32, No. 3, 304–309 (March 1940).

WILLIAM H. SHORT, Primary Examiner

L. M. PHYNES, Assistant Examiner

U.S. Cl. X.R.

260—31.2

UNITED STATES PATENT OFFICE
CERTIFICATE OF CORRECTION

Patent No. 3,539,534   Dated   November 10, 1970

Inventor(s)   Carl R. Manganaro et al.

It is certified that error appears in the above-identified patent and that said Letters Patent are hereby corrected as shown below:

TABLE 1, heading "Reactions conditions" should read -- Reaction conditions --; under heading "Time, hrs. - Ex.A" "2-1/2" should read -- 2-1/3 --.

Signed and sealed this 15th day of June 1971.

(SEAL)
Attest:

EDWARD M. FLETCHER, JR.                WILLIAM E. SCHUYLER, JR.
Attesting Officer                      Commissioner of Patents